March 3, 1931.  G. E. PELLISSIER  1,795,035
FLYING MACHINE
Filed July 8, 1929  2 Sheets-Sheet 1

INVENTOR.
George E. Pellissier,
BY
Harry W. Bowen.
ATTORNEY.

March 3, 1931.  G. E. PELLISSIER  1,795,035
FLYING MACHINE
Filed July 8, 1929  2 Sheets-Sheet 2
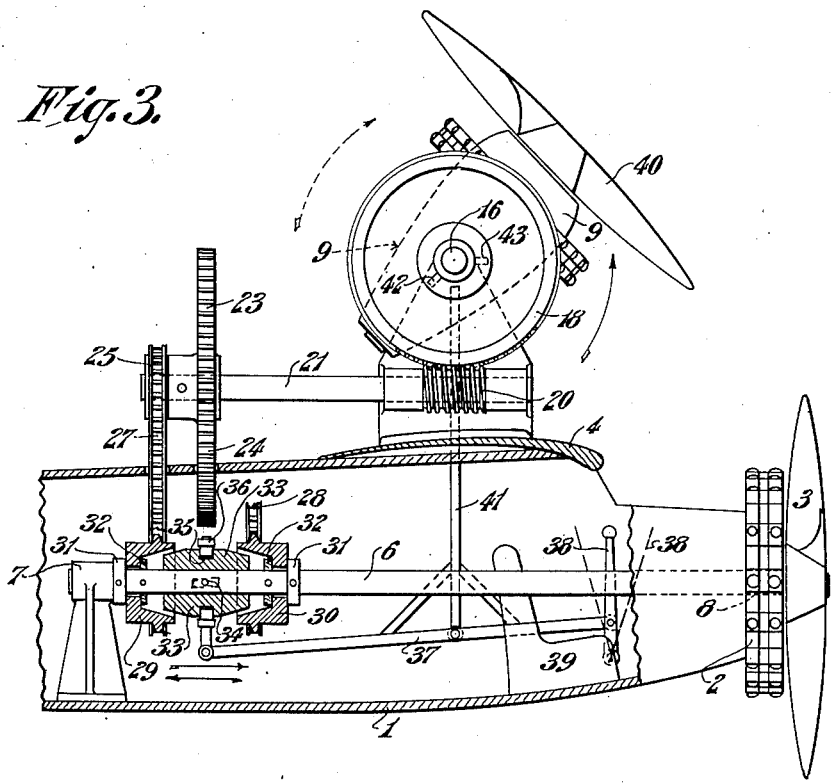
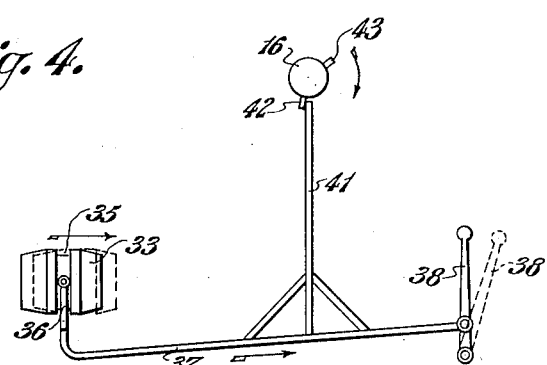
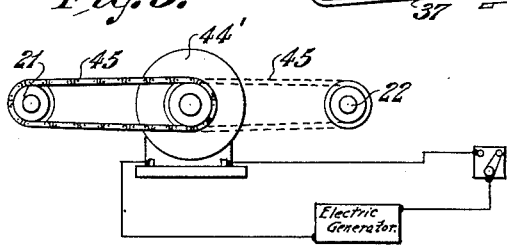
INVENTOR.
George E. Pellissier,
BY Harry W. Bowen,
ATTORNEY.

Patented Mar. 3, 1931

1,795,035

UNITED STATES PATENT OFFICE

GEORGE E. PELLISSIER, OF HOLYOKE, MASSACHUSETTS

FLYING MACHINE

Application filed July 8, 1929. Serial No. 376,650.

This invention relates to improvements in flying machines, or as they are sometimes called, airplanes.

An object of the present invention is to so arrange or locate the motors of such a machine for the purpose of supporting the machine in the air in a hovering or practically stationary position, at desirable elevations.

A further object of the invention is to so mount such motors on a flying machine that it may be possible, during its rising or upward flight movement to assist in reducing the time of ascent and in a sharply inclined or steep position, or angle with reference to the ground and thereby reach a desired elevation in a short time. A further object of the invention is to provide means for definitely limiting the extreme angular positions of the motors, for effecting a quick rise at a sharp angle and to vary the time of descent.

Broadly, the invention comprises a flying machine of the conventional type with a propelling motor located on each of the wings. Means is provided for mounting these motors, so as to position them in different angular positions of adjustment, whereby the positions of the motors and their propeller blades will operate to cause the machine to quickly ascend and maintain it in the air, in substantially a hovering position.

Further objects and nature of the invention will appear in the body of the specification with reference to the drawings.

At the present time, so far as I am aware, no means is provided for causing the machine to ascend quickly and at a sharp angle and with means for varying such ascent movements.

Referring to the drawings:

Fig. 3 is an enlarged side elevation, partly in section, on the line 3—3 of Fig. 1 illustrating the main drive shaft, with the connecting and reversing mechanism for varying the angular position of the motors which are located on the wings.

Fig. 4 is a detail view of the stop or limiting mechanism for determining the final angular position of the motors, and Fig. 5 is a detail view showing a separate motor for tilting the supplemental motors.

Figures 1, 2:
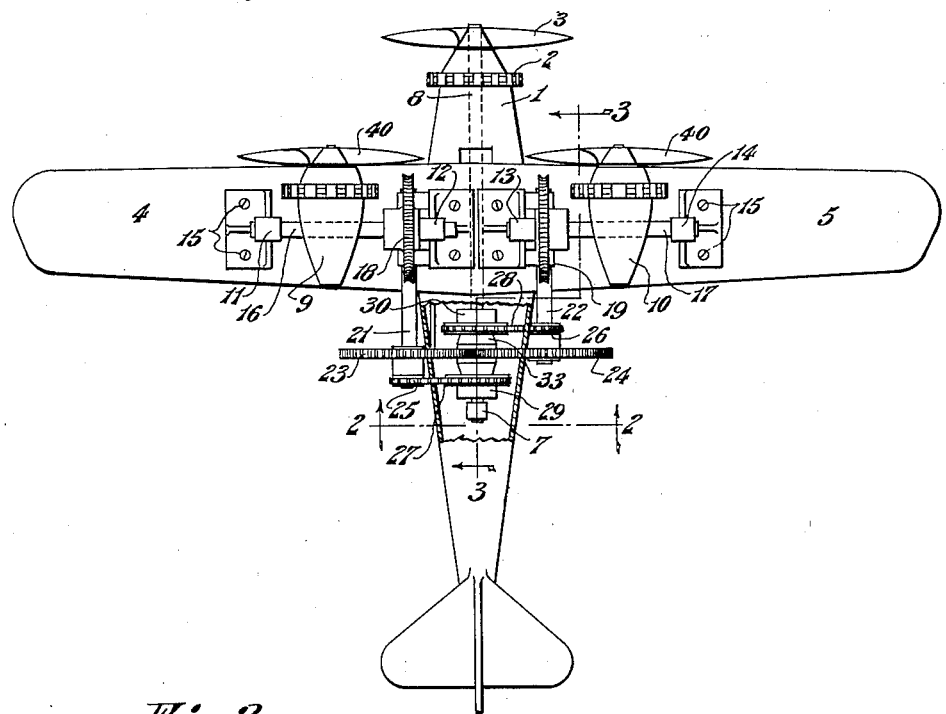
Fig. 1 is a plan view of the complete airplane showing the propelling motors and the mechanism for tilting these motors above a horizontal supporting axis.
Fig. 2 is a transverse sectional view on the line 2—2 of Fig. 1 showing the connecting means for rotating or tilting the motors located on the wings and operated from the drive shaft of the main motor.

Referring to the drawings in detail:

1 designates the shell or fuselage part of the flying machine, 2 is the usual or main motor or engine located at the forward end of the shell, 3 is the propeller blades of this motor, 4 and 5 designate the two supporting wings, 6 is the main shaft mounted in the bearings, 7 and 8.

Located on each of the wings 4 and 5 is a motor 9 and 10.

These motors are pivotally mounted or supported in the bearings 11, 12, 13 and 14, which are secured on the upper surface of the wings 4 and 5, as shown at 15. 16 and 17 are supporting shafts for the motors, 9 and 10. Secured to each of the shafts, 16 and 17, is a worm gear wheel, 18 and 19. 20 are worms which mesh with and operate the worm gears for rotating the shafts 16 and 17 for tilting these motors.

21 and 22 are the worm gear shafts which drive and carry the worms 20. Secured on the rear ends of the worm shafts, 21 and 22, are spur gears, 23 and 24, which mesh with each other and therefore rotate in opposite directions. Secured to each of the shafts 21 and 22, are sprocket gears, 25 and 26, which are operatively connected together by means of the sprocket chains, 27 and 28, to the revoluble respective friction cone members, 29 and 30, which are loosely mounted on the main drive shaft 6 between the fixed collars, 31 and 32. 33 is a double faced cone clutch member, which is slidably secured to the shaft 6 with a slot and pin, or spline and groove connection 34. This clutch member is formed with a groove 35 in which is located the yoke 36. 37 designates an operating or clutch shifting rod, which is connected to the yoke 36. This rod is connected to the hand operating lever 38 within reach of the operator's seat 39. 40 designates the propeller blades of the motors, 9 and 10.

Attached or secured to the shifting rod 37 is a rod 41 whose upper end is located in the path of the pins 42 and 43 on the rotatable supporting motor shafts 16 and 17, which engage the rod 41 for shifting the double cone clutch member 33 into a neutral position.

The usual supporting rollers or wheels 44 are provided for supporting the fuselage or shell, when on the ground.

The operation is as follows: Assuming that the motors 2, 9 and 10 are being operated and the operator wishes to ascend, he shifts the cone clutch member 33, so as to cause the motors, 9 and 10, to be tilted by means of the sprocket chain and gear connections, into any desired inclined or angular position. He then releases the cone clutch member 33 from the cone clutch, which prevents further operation of the worms, 20, and worm gears 18 and 19. The worm and worm gears will, of course, retain the motors, 9 and 10, stationary, in any of their adjusted angular, or inclined, positions. The stop pins, 42 and 43, are so positioned, with reference to each other, that the operator cannot shift the cone clutch member 33, from its neutral position with the lever 38. The worm and gears will retain the shafts 16 and 17 against further movement. In other words, during the tilting operations of the motors 9 and 10, when they have reached their extreme upward or lowest tilted position, one of the pins, 42 or 43, will operate to shift the cone 33 into its neutral position, thus preventing any further tilting movement of the motors in that direction. The operator can, of course, cause the supplemental motors, 9 and 10, to be moved into a state of rest at any angular position intermediate the pins, 42 and 43.

It will, therefore, be seen that I have provided a flying machine with a set of motors and propeller blades located in such a manner that they may be positioned on the wings and which may be positioned or tilted into different angular positions for assisting the motor 2, to rise either quickly or slowly and to descend in the same manner. These motors permit the machine to assume substantially a hovering position in the air or to be propelled forward at a greater speed, as desired.

Referring to Fig. 5, in which a separate motor 44' is connected to either of the worm shafts 21 or 22 with the chains 45 for separately operating these shafts to simultaneously tilt both of the motors 9 and 10 into any desired angular position, without operatively connecting them to the main shaft 37 of the machine. In other words, the operative connecting means between the shaft 6 and the worm shafts 21 and 22 is omitted.

It is, of course, obvious that any other kind of a motor may be substituted for the electric motor 44, as a spring motor or even a small internal combustion engine may be substituted for the electric motor 44'.

It is also obvious that I do not limit myself to a monoplane machine, as a biplane or triplane may, if desired, be so equipped.

What I claim is:

1. In combination, in a flying machine, motors pivotally mounted on the machine and carrying propeller blades, a main motor, a shaft operated from the main motor, and operative connecting means between the said shaft and said motors for placing the motors in different angular positions.

2. In combination, in a flying machine propelling motors pivotally mounted on the machine and carrying propeller blades, operative means for placing the motors in different angular positions, and means for retaining the motors in their adjusted angular positions, said retaining means comprising a supporting shaft for each of said motors, a worm gear on each supporting shaft, a worm engaging each worm gear, means for automatically limiting the extreme angular or tilted positioning movements of the propelling motors and operative devices for moving the motors into a neutral or inoperative position.

3. In combination, in a flying machine, a main motor, a main shaft operable from the main motor, additional propelling motors, each one of which is pivotally supported on a shaft, a worm gear on each of said shafts, gears secured to the worm gear shafts and meshing with each other, clutch members loosely mounted on the main shaft, means for operating the gears and worms from the clutches, means on the main shaft for engaging either one or the other of the clutches for changing the direction of rotation of the gears and worms and also the angular positions of the axis of the additional propelling motors, and means for positively limiting the extent of angular motor and position of the additional motion.

4. In combination, in a flying machine, propelling motors therefor which are pivotally mounted on the machine and carrying propeller blades, a main motor and operative means between the propelling motors and main motor including worm gearing for placing the motors in different angular positions of adjustment, a main shaft, operatively connecting means between the main shaft and said propelling motors, means comprising stop pins carried by the shafts of the said propelling motors for positively limiting the extreme angular or tilted positioning movements of the propelling motors, a clutch device between the main shaft and said propelling motors, said pins being located for engagement with the clutch device.

GEORGE E. PELLISSIER.